United States Patent [19]
Nordquist

[11] Patent Number: 5,997,011
[45] Date of Patent: Dec. 7, 1999

[54] RETAINING DEVICE, IN PARTICULAR FOR A WORKPIECE

[75] Inventor: Hakon Nordquist, Täby, Sweden

[73] Assignee: System 3R International AB, Vallingby, Sweden

[21] Appl. No.: 09/155,057

[22] PCT Filed: Jan. 23, 1998

[86] PCT No.: PCT/EP98/00365

§ 371 Date: Sep. 23, 1998

§ 102(e) Date: Sep. 23, 1998

[87] PCT Pub. No.: WO98/32565

PCT Pub. Date: Jul. 30, 1998

[30] Foreign Application Priority Data

Jan. 23, 1997 [DE] Germany .......................... 197 02 227

[51] Int. Cl.[6] .................................................. B23B 5/22
[52] U.S. Cl. ...................... 279/2.09; 279/2.12; 279/2.23; 279/4.01
[58] Field of Search ................... 279/2.09, 2.12, 279/2.23, 4.01

[56] References Cited

U.S. PATENT DOCUMENTS 4,652,203  3/1987  Nakashima et al. .
4,855,558  8/1989  Ramsbro .
4,881,745  11/1989 Peters ...................................... 279/2.09
4,958,839  9/1990  Guzik et al. ............................ 279/2.23
5,415,384  5/1995  Obrist et al. .

FOREIGN PATENT DOCUMENTS 282417    9/1988   European Pat. Off. .
57-89549  6/1982   Japan .
405285716 11/1993  Japan .................................. 279/2.23
1425968   10/1990  U.S.S.R. ............................... 279/2.23

Primary Examiner—Andrea L. Pitts
Assistant Examiner—Monica Smith
Attorney, Agent, or Firm—Jacobson, Price, Holman & Stern, PLLC

[57] ABSTRACT

A retaining device has clamping elements arranged on a housing that act as detachable locking elements and can be radially displaced when a pressure member located in the housing is axially displaced. First and second pressure media can act upon the pressure member in the axial direction and the second pressure medium acts upon the pressure member in the opposite direction to the first pressure medium. The retaining device is considerably simplified in that two chambers which follow each other in the axial direction are designed in the housing and separated by a membrane anchored on the housing and having axially movable sections. The pressure member is joined to the membrane and at least one of the chambers can be connected to a pressure medium source.

19 Claims, 5 Drawing Sheets

RETAINING DEVICE, IN PARTICULAR FOR A WORKPIECE

BACKGROUND OF THE INVENTION

1. Field of the Invention

The invention concerns a holder with clamps on its housing that move radially upon an axial movement of a pressure element, whereby the pressure element in located the housing can be acted axially upon by a first and second pressure medium, where the second pressure medium acts on the pressure element in the opposite direction as the first pressure medium.

2. Description of the Related Art

The document EP A 0255 042 (corresponding to U.S. Pat. No. 4,855,588), describes a holder in the form of a machine tool, e.g. a chuck attachable to an electrical discharge forming machine that can hold a work piece or tool. A tie bolt that couples with the workpiece fits in an opening of the chuck in which the tie bolt is held by a ball lock under the effect of pressure springs and can be released by compressed air acting against the pressure springs.

With the holder described in EP A 0614725 (correspond to U.S. Pat. No. 5,415,384), a pin projects from the workpiece to be held that can be held by a ball lock in a housing of the holder. The ball lock grips the pin under the effect of pressure springs acting on a pressure element. To release the workpiece, the pressure element is acted on by compressed air that acts against the pressure springs.

BRIEF DESCRIPTION OF THE INVENTION

The invention is based on the problem of substantially simplifying the initially-cited holder. According to the invention, there are two axially sequential chambers in the housing separated by a membrane anchored to the housing. The pressure element is connected to the membrane, and at least one of the chambers connects to a medium pressure source. The holder can be designed substantially flatter which makes it very cheap to manufacture. In addition, the response time of the pressure element to the first or second pressure means is very short so that a workpiece is clamped and released by the holder according to the invention very quickly and forcefully.

The membrane suitably consists of a disk or ring of flexible artificial material, e.g. rubber. In addition, it is recommendable to run the pressure element axially in the housing, suitably in a tube inserted in the housing. The pressure piece can consist of a cylindrical piston. Cones are on the free end that abut the clamps. It is advantageous for their to be a plate at the foot of the piston that nearly fills up the chambers radially. The membrane clamped to the housing is affixed to the edge of the plate. Between the floor of the chamber and the bottom of the plate, a cup spring can be clamped as a pressure medium.

In one particularly favorable development of the invention, the release pressure can be substantially increased using an auxiliary piston or an additional plunger. Although the workpiece can be held at a high pressure using the holder according to the invention, the increased release pressure quickly and easily releases the workpiece without jamming, etc. The invention enables the stroke of the pressure element to be only 1–3 mm between holding and releasing.

BRIEF DESCRIPTION OF THE DRAWINGS

The invention will be described in detail in the following with reference to the exemplary embodiments described in the drawing. Shown are.

DETAILED DESCRIPTION OF THE INVENTION

Figure 1:
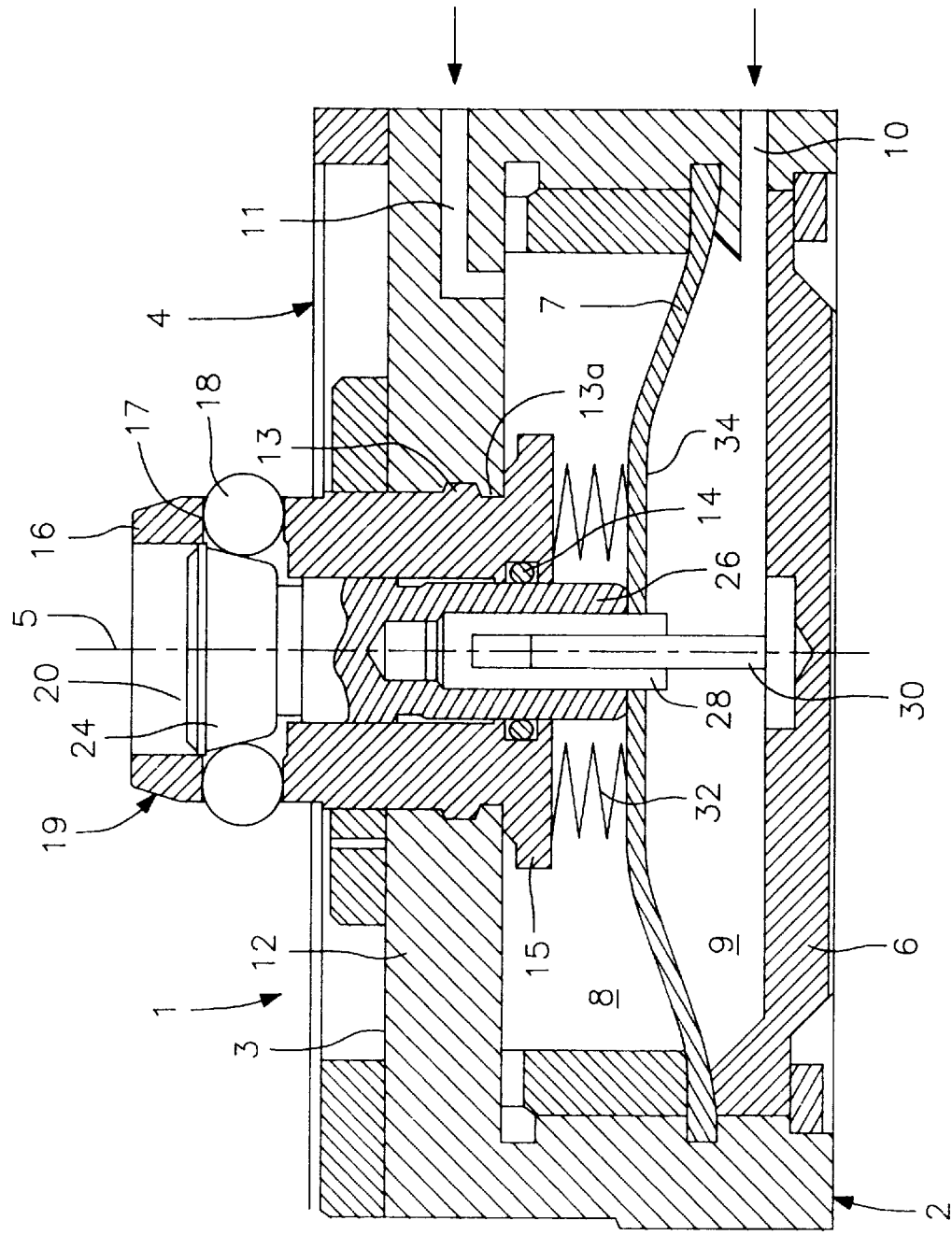
FIG. 1 depicts a schematic axial section of a chuck that can be attached to an electrical discharge forming machine to hold a palette.

The chuck identified as a whole with 1 in FIG. 1 has a housing 2 e.g. made of tool steel whose midaxis is identified with 5. On the top 3 of the cylindrical or rectangular housing block 2 are reference elements identified with 4 as a whole in the form of grooves or pins (not shown) that interact with counter-reference elements on the bottom of a palette (not shown) to exactly and repeatedly position the palette relative to the housing block 2 in an orthogonal system whose X-Y plane is e.g. parallel to the top 3, and whose Z axis is congruent with the midline 5. Such reference elements and counter-reference elements are prior art e.g. in EP A 0255042, so that they do not need to be represented further and described here.

On the side opposite the top 3, the housing block 2 is sealed by a plate 6. The hollow interior of the housing block 2 is divided by an axially-moving membrane 7 (i.e. moveable toward the midline 5 and anchored in the side walls of the housing block 2) into a front chamber 8 and a rear chamber 9. The rear chamber 9 has a through hole 10 leading to the outside of the housing block 2 by means of which the rear chamber 9 can be connected to a compressed air source (not shown) via suitable controls.

Correspondingly, another through hole 11 leads out of the front chamber 8 through the side wall of the housing block to the exterior of the housing block 2 so that the front chamber 8 can also be connected via the through hole 11 to a compressed air source by means of suitable controls.

A thick-walled pipe piece 19 extends through a through hole symmetrical to the midline 5 through the front plate 12 forming the top 3 of the housing block 2. The pipe piece has an inner, radially-projecting collar 15 that abuts the inner surface of the face plate 12. The pipe piece 19 projects out of the top 3 and beyond the reference elements 4 in a section 16 that has several equally-spaced, peripheral radial holes. Each of these radial holes 17 holds a ball, i.e., ball 18 whose radial movement is restricted so that none of the balls 18 can leave their associated radial hole in a radial direction.

In addition, the pipe piece 19 is held against rotation in the through hole and can only move slightly in an axial direction against the effect of the pressure springs 32, 34. The nose 13 projecting radially out of the pipe piece 19 projects into a short lengthwise slot 13a in the wall of the through hole.

In the central channel of the pipe piece 19 is an axially moving piston 20 that is sealed against the front chamber 8 by a ring seal 14 in an annular groove of the pipe piece 19. The wide head of the piston 20 is in a radial expansion of the central channel, and its periphery is designed as an outwardly-expanding cone 24. Each of the balls 18 lies on the cone 24 as shown in FIG. 1 so that when the piston 20 moves into the chamber 8, the balls 18 are pressed radially outward. When the piston 20 moved outwards, the balls 18 are moved radially inward into their radial holes 17. The pipe piece 19 with the radial holes 17, the balls 18 and the piston 20 form a ball lock.

The inner end of the piston shaft 26 is connected to the top of the membrane 7. A shell 28 inserted into the piston shaft 26 extends through a central opening in the membrane 7. The shell 28 holds an upright finger 30 attached to the middle of the plate 6 so that the piston 20 is guided by the finger 30 when it moves axially along the midaxis 5 and not just by the central channel of the pipe piece 19.

Peripherally surrounding the inner end section of the piston shaft 26 are several equally-spaced pressure springs 32, 24 (cited above) of which each abuts the top of the membrane 7 and against the bottom of the ring collar 15.

When the same air pressure is in the front chamber 8 and in the back chamber 8, the pressure springs 32, 34 push the membrane 7 with the attached piston 20 inward so that the balls 18 are pushed radially outward. If the palette to be connected to the chuck 1 has a hole whose width is approximately that of the diameter of the circumference of the balls 18, the chuck is in the optimum holding position under the cited pressure. The balls 18 hold the palette by contacting the approximately conical surface in the cited hole.

To open the chuck, i.e., to release the palette, the rear chamber 9 is filled with compressed air from the cited compressed air source that presses the middle section of the membrane 7 and then the piston 20 outward to overcome the holding force of the pressure springs 32, 24 so that the balls 18 can move radially inward.

The retention force of the chuck 1 is increased when the front chamber 8 is acted upon by compressed air that increases the retention force of the piston 20 beyond the retention force developed by the pressure springs 32, 24.

Figure 2:
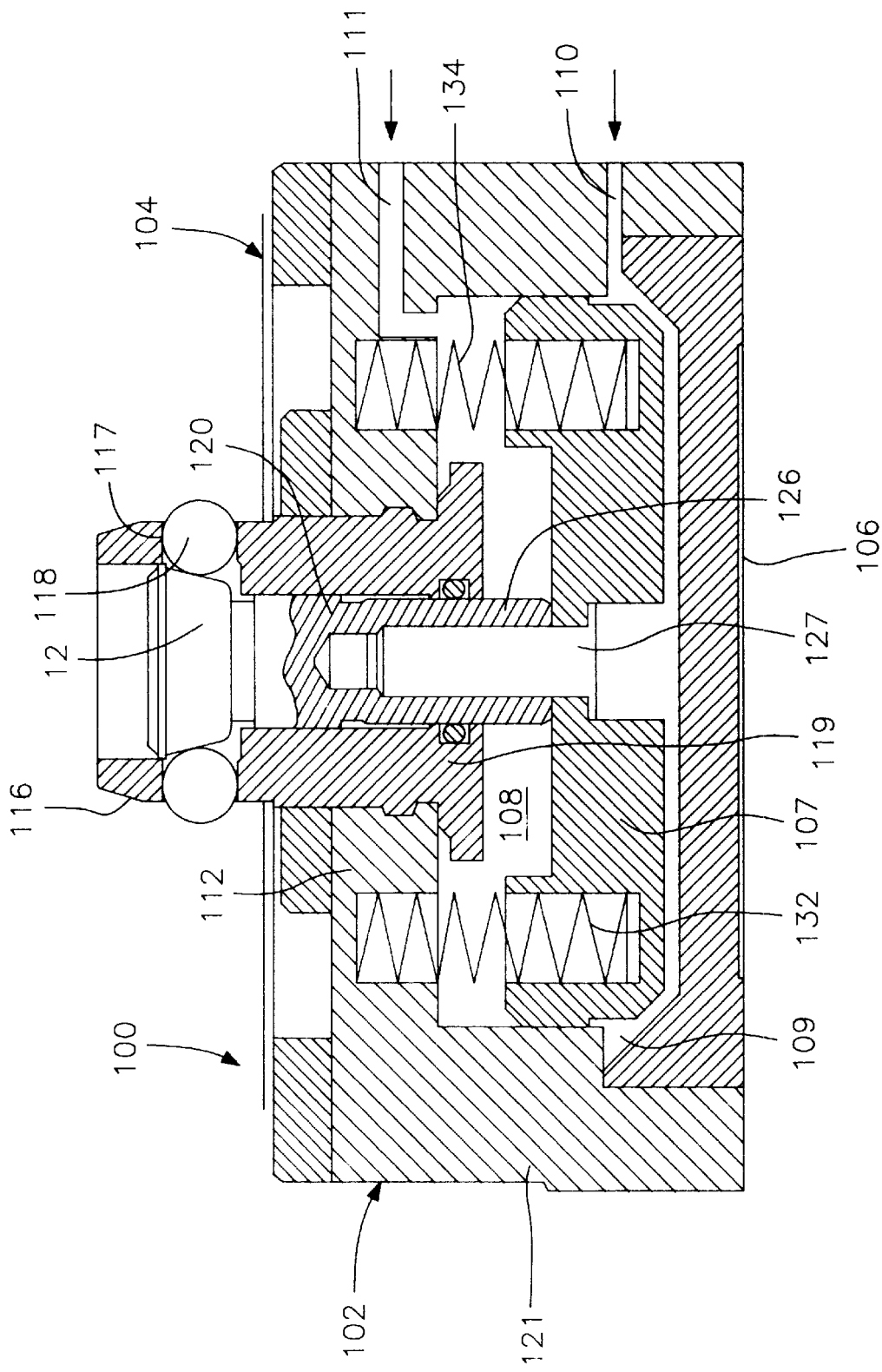
FIG. 2 depicts a schematic axial section of another embodiment of the chuck.

The second exemplary embodiment of the invention in FIG. 2 basically differs from the above-described exemplary embodiment in that the membrane 7 is replaced by a thrust piston 107 supported by several pressure springs 132, 134 on the front plate 112, and the piston shaft 126 is anchored to the central section of the piston with a bolt 127. The thrust piston 107 moves axially along the inner wall of the casing 121 of the housing block 102 of the chuck identified as a whole with 100 and thereby separates the front chamber 108 from the rear chamber 109. Since the pressure springs 132, 134 abut the front plate 112, a ceratin amount of air pressure must be maintained in the front chamber 108 to prevent the pipe piece 119 from retracting into the inside of the housing block 102 under the effect of a palette pushed by the balls 118. On the other hand, it of course lies within the framework of the invention to affix on the outer section 116 of the pipe piece 119 a radially-projecting collar that prevents the pipe piece 119 from shifting into the housing block 102. In addition, the air pressure in the front chamber 108 supports the retention force developed by the pressure springs 132, 134.

To release the ball lock, the rear chamber 109 is acted upon by a sufficient amount of compressed air as in the above-described example so that the thrust piston 107 is moved outward with the piston 120 and allows the balls 118 to escape radially inward.

Figure 3:
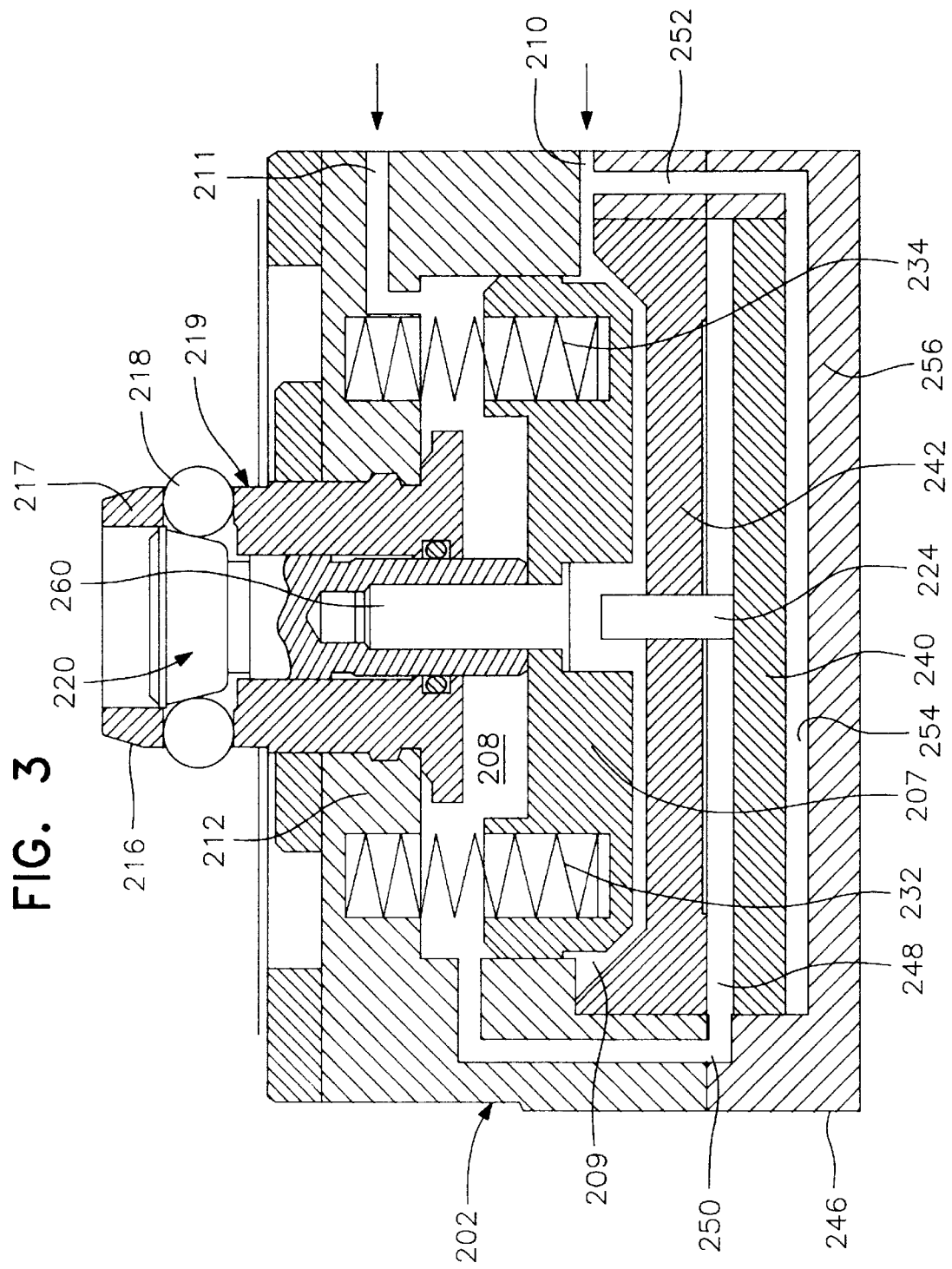
FIG. 3 depicts a schematic axial section of a third embodiment of the chuck.

In the third exemplary embodiment of the invention in FIG. 3, the retention force is increased in that the effective surface of the thrust piston 207 is increased by the effective surface of an auxiliary piston 240 that is coaxial with and behind the thrust piston 207 and connected to it by a pin 224 that penetrates an intermediate plate 242. Pressure springs 232, 234 abut the front plate 212 and the thrust piston 207.

In addition, the auxiliary piston 240 is in a shoulder 246 of the housing block 202 that replaces the plate 6 so that, between the bottom of the intermediate plate 242 and the top of the auxiliary piston 240, there is an intermediate chamber 248 which communicates with the front chamber 208 via a compressed air channel 250.

By means of another compressed air channel 252, the rear chamber 209 communicates with an auxiliary chamber 254 that extends between the bottom of the auxiliary piston 240 and the closing plate 256 of the shoulder 246.

The rear chamber 209 and the compressed air channel can be connected to a compressed air source via a compressed air connection 210, and the front chamber 208 can be connected via a compressed air connection 211 to a compressed air source by means of a control device (not shown).

The retention force is increased in that the intermediate chamber 248 is filled with the same amount pressure as the front chamber 208 when it is filled with compressed air; the auxiliary piston 240 is drawn further inward together with the thrust piston 207 to which it is connected via pin 224. This tensile force is transferred from both pistons via a bolt 260 directly to piston 220.

To release the ball lock, the release force is generated by the compressed air acting in the rear chamber 209 on the thrust piston 207. The pressure only increases by the predominating pressure in the auxiliary chamber 254 when the channel 250 is closed by the auxiliary piston 240 entrained by the thrust piston 207.

Figure 4:
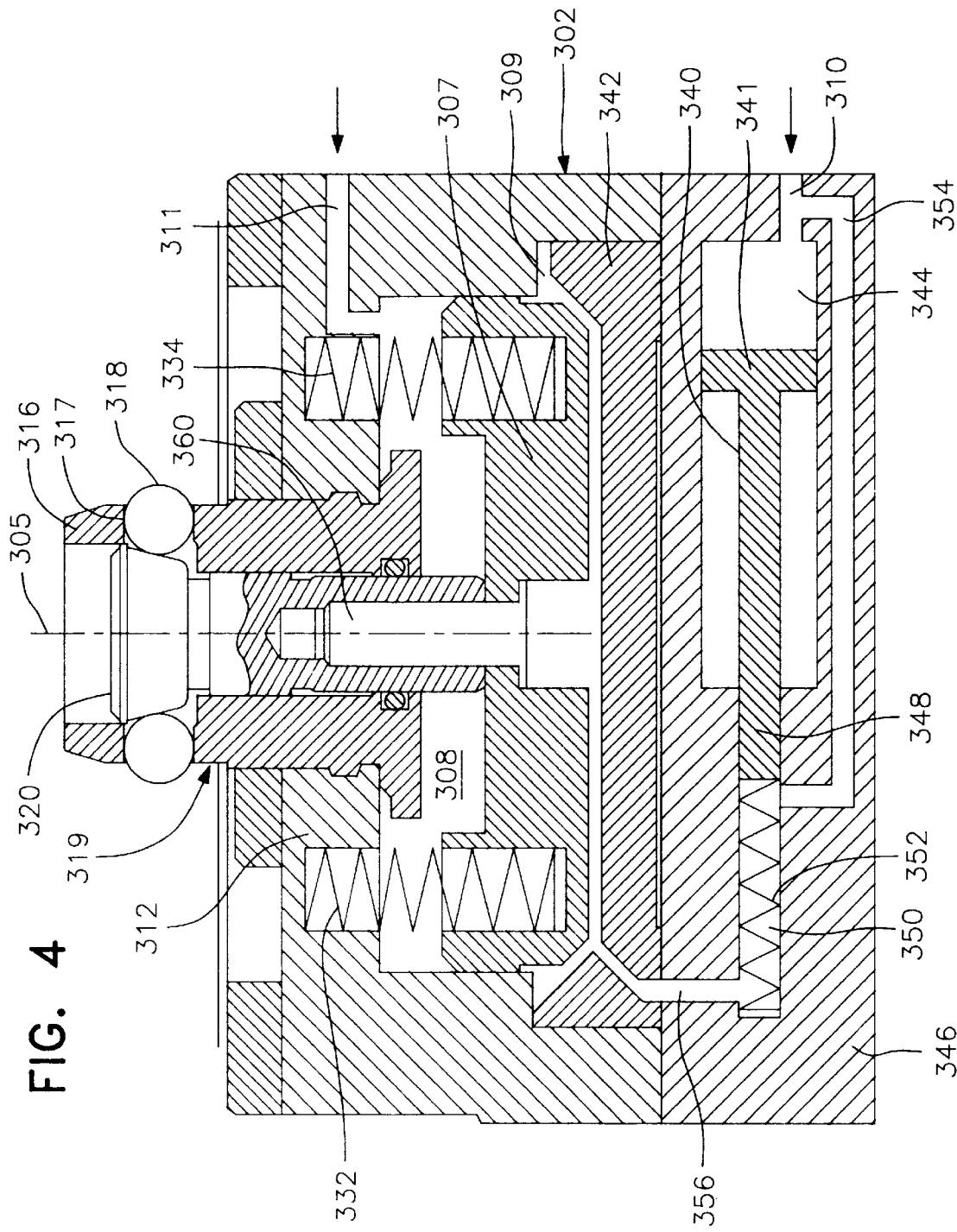
FIG. 4 depicts a schematic axial section of a fourth embodiment of the chuck.

In the additional exemplary embodiment of the invention in FIG. 4, a projection 346 of the housing block extends further axially than the front plate 312. In the projection is mounted perpendicular to the midline 305 of the housing block 302 a plunger that moves in a perpendicular direction. The wide head 341 of the plunger 340 can move in a recess 344 whose lengthwise axis is perpendicular to the midline 305. The part of the recess 344 in front of the face of the head 341 is connected by a medium channel 310 to the exterior of the housing block 302. The slender end 348 of the plunger 340 opposite the head 341 moves in a blind hole 350 continuing the recess 344 perpendicular to the midline 305 against the relatively slight force of a pressure spring 352 that abuts the dead end of the hole 350.

From the medium channel 310 branches a side medium channel 354 that extends parallel to the lengthwise axis of the recess 344 and ends behind the end 348 of the plunger 340 in the hole 350. The plunger 340 is then in a forward starting position as shown in FIG. 4. The hole 350 is connected via another medium channel 356 to the rear chamber 309 and branches off from hole 350 close to its blind end.

The interior of the housing block 302 is divided by a thrust piston 307 into a front chamber 308 (that can be connected to a compressed air source via a compressed air connection 311), and into the cited rear chamber 309. The thrust piston 307 moves axially along the inner wall of the casing of the housing block 302 against the effect of several pressure springs 332, 334 abutting the front plate 312. The thrust piston 307 is fixed via a bolt 360 to the piston 320 that is symmetrical to and that moves along the midline (305).

Otherwise, the further details of the embodiment of the invention in FIG. 4 correspond to the features described in relationship to FIG. 2.

The closing pressure for the ball lock 317, 318 is generated by the pressure springs 332, 334 and by the compressed air fed through the front chamber 308. When the ball lock closes, the thrust piston 307 assumes its bottom dead point position shown in FIG. 4 where the head of the bolt 360 rests on the plate 342 inside of the housing block 302 (up to the medium channel 356).

To release or open the ball lock 317, 318, compressed air is fed through the medium channel 310 whose full initial pressure through the medium channels 354, 350, 356 acts on the bottom of the thrust piston 307 and lifts it axially against the effect of the pressure springs 332, 334. This opening pressure is increased by the plunger 340 in that the plunger 340 is moved to the left due to the pressure at the face of its head 341 in the recess 344 and in the hole 350 in the drawing shown in FIG. 4, and this blocks the medium channel 354. The full opening pressure acts on the plunger 340 that is increased due to the smaller effective area of the end 348 so that increased opening pressure acts on the thrust piston 307. The pressure is large enough to release any jamming of the bail lock 317, 318.

The spring 352 only serves to push back the plunger 340 into the starting position in FIG. 4 from the position closing the channel 354 after the pressure of the compressed air fed to the medium channel is reduced.

It of course lies within the scope of the invention to use hydraulic media such as oil or water or another gas as a second compression agent instead of the cited compressed air.

In addition, it is to be noted that the axial path of the axially-moveable part of the membrane 7 or the thrust piston 107, 207, 307 is only ca 1–3 mm so that the housing block can be kept very flat, or the axial height only needs to be slight.

Figure 5:
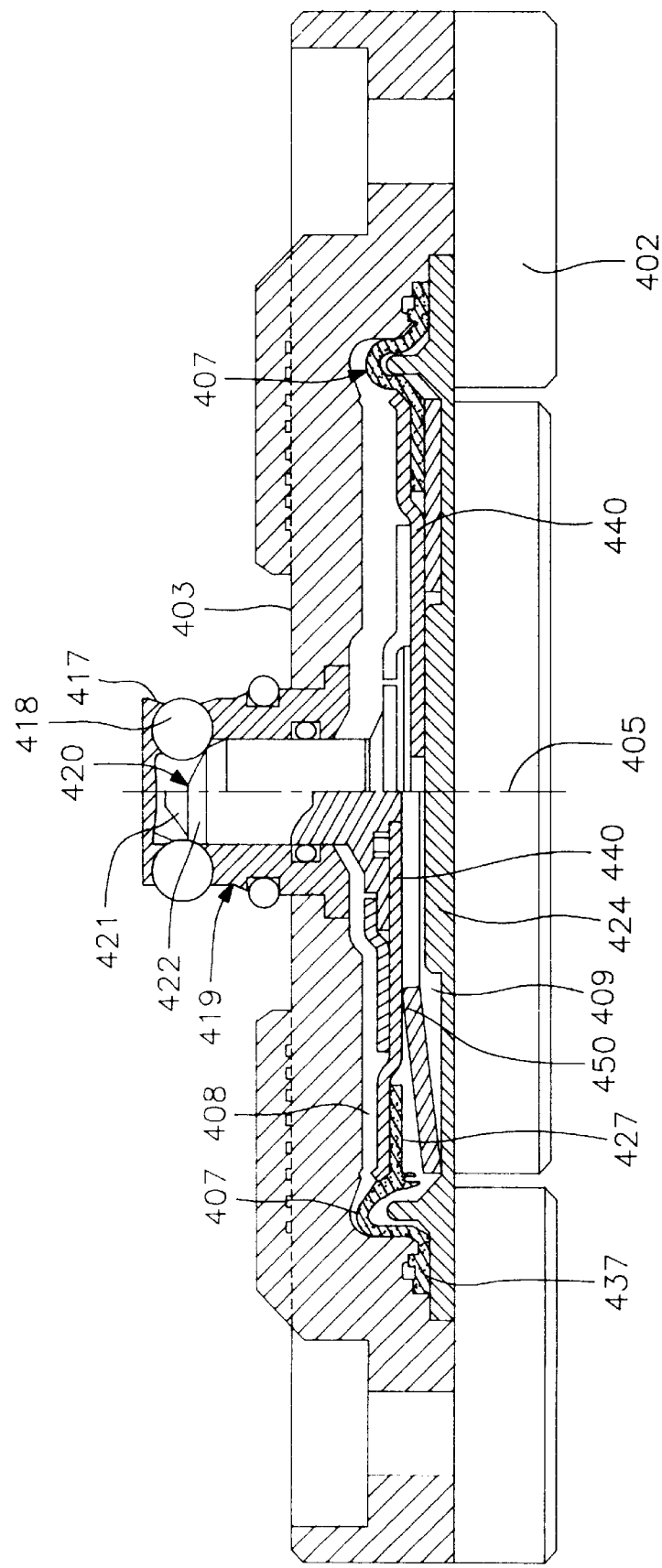
FIG. 5 depicts a schematic axial section of another embodiment of the invention.

Finally, FIG. 5 shows another embodiment of the invention in which the housing 402 encloses an essentially cylindrical cavity 408, 409. The cavity 408, 409 has a central axial opening in which a cylindrical pipe piece 419 is fixed. The pipe piece 419 extends beyond the top surface 403 of the housing 402 and has on its free end evenly-spaced, peripheral radial holes 417. In each of the radial holes is a radially-moving ball 418 of a ball lock. In the central hole of the pipe piece 419 is an axially moving, sealing piston 420 that is provided on its free end with wedge surfaces 421, 422 stepped radially inward. The balls 418 of the ball lock lie radially on the wedge surfaces 421, 422. Affixed to the foot of the cylindrical piston 420 extending into the cavity 408, 409 is a disk-shaped plate 440 that largely fills the cavity 408, 409 radially. An annular rubber membrane 407 is clamped to the housing along its outer edge 437, and its inner edge 427 is attached to the edge of the plate 440. The cavity is divided into a front chamber 408 and a rear chamber 409 by the membrane 407. The outer edge of an axially-spreading flat spring 450 abuts the floor 424 of the rear chamber 409, and its inner edge contacts the bottom of the plate 440.

A first pressure medium channel (not shown) ends in the front chamber 408 through which the front chamber 408 can be pressurized from an external pressure medium source. In addition, another pressure medium channel (not shown) that communicates with the rear chamber 409 can supply the rear chamber 409 with pressure via an external pressure medium source.

The midline 405 of the piston 420 is also congruent with the direction of the Z axis.

The left part of FIG. 5 shows the piston 420 with a plate 440 and membrane edge 427 in a lifted position from the effect of the flat spring 450; the balls 418 are forced outward radially into a position holding a workpiece, e.g. a palette. The right half of FIG. 5 shows a lowered position of the piston 420 that is attained by pressurizing the front chamber 408 against the effect of the flat spring 450 so that the balls 418 of the ball lock can move radially inward and allow the work piece to be released from the holder. As can be seen, the bottom dead point of the piston stroke is obtained when the plate 440 sits on the chamber floor 242. The top dead point of the piston stroke is defined by the workpiece that only allows a limited radial outward movement of the balls 418.

I claim:

1. A holder with clamping elements that act as a releasable lock, said clamping elements movable radially by the axial movement of a pressure element, whereby the pressure element is movable axially within a housing by a first and second pressure means, and the second pressure means acts on the pressure element in the opposite direction of the first pressure means, further comprising two axially oriented, sequential chambers in said housing divided by a membrane that moves axially and is anchored to the housing, whereby the pressure element is connected to the membrane, and at least one of said chambers communicates with a medium pressure source.

2. The holder according to claim 1, wherein said first pressure means includes a plurality of pressure springs in a chamber that act on said membrane.

3. A holder according to claim 1, wherein said first pressure means comprises a pressure medium in one of said chambers whereby said one chamber connects to a medium pressure source.

4. A holder according to claim 1, wherein said pressure element comprises a cylindrical piston whose shaft is connected to the membrane, and whose head has a cone that abuts the clamping elements.

5. A holder according to claim 1, wherein said clamping elements are several balls distributed peripherally evenly.

6. A holder according to claim 1, wherein said pressure element and said clamping elements project axially from a front wall of the housing.

7. A holder according to claim 2, wherein said pressure element is guided axially in a pipe section, said pipe section extending from said housing and is fixed in the housing, said pipe section accepts the clamping elements close to a free end of said pipe section.

8. A holder according to claim 7, wherein said pressure springs abut said pipe section that is held in a middle hole of a front wall of said housing, said pipe section having several radial holes that accept said clamping elements.

9. A holder according to claim 4, further comprising a disk-shaped plate attached to the foot of the piston that nearly fills the chambers radially, whereby said membrane is fixed to the housing and is attached to the edge of a plate.

10. A holder according to claim 9, further comprising an axially-spreading spring ring that abuts the bottom of said plate and a chamber floor.

11. A holder according to claim 1, wherein said membrane comprises a flexible artificial material, such as rubber.

12. A holder according to claim 4, wherein said membrane is a thrust piston that moves axially in the housing.

13. A holder according to claim 12, further comprising a plurality of pressure springs between a front plate of the housing and the thrust piston.

14. A holder according to claim 2, wherein said thrust piston is connected to a shaft of said cylindrical piston with a bolt.

15. A holder according to claim 12, further comprising an auxiliary piston axial to and behind the thrust piston to increase pressure, and further pressure chambers are to the front and rear of said auxiliary piston.

16. A holder according to claim 15, wherein said auxiliary piston is fixed to said thrust piston.

17. A holder according to claim 16, wherein said front chamber communicates via a medium channel with one of the auxiliary chambers in front of the face of the auxiliary piston.

18. A holder according to claim 17, wherein a rear chamber communicates via an auxiliary channel with another auxiliary chamber that is to the rear of the auxiliary piston.

19. A holder according to claim 18, wherein said auxiliary piston is a plunger that moves perpendicular to the midline of the housing having a slim shaft that communicates via a medium channel, and having a wide head that communicates with the rear chamber via another medium channel when the holder is opened.

* * * * *